(12) United States Patent
Hurd et al.

(10) Patent No.: US 12,031,300 B2
(45) Date of Patent: Jul. 9, 2024

(54) HIGH-ACCURACY AUGMENTED REALITY DISPLAY FOR CONSTRUCTION MACHINES

(71) Applicant: Trimble Inc., Sunnyvale, CA (US)

(72) Inventors: Darrin Hurd, Christchurch (NZ); Stuart Ralston, Christchurch (NZ)

(73) Assignee: Trimble Inc., Sunnyvale, CA (US)

( * ) Notice: Subject to any disclaimer, the term of this patent is extended or adjusted under 35 U.S.C. 154(b) by 236 days.

(21) Appl. No.: 17/090,653

(22) Filed: Nov. 5, 2020

(65) Prior Publication Data

US 2022/0136214 A1 May 5, 2022

(51) Int. Cl.
*B60K 35/00* (2024.01)
*B60K 35/23* (2024.01)
*B60K 35/28* (2024.01)
*B60K 35/60* (2024.01)
(Continued)

(52) U.S. Cl.
CPC .............. *E02F 9/261* (2013.01); *B60K 35/00* (2013.01); *E02F 9/264* (2013.01); *B60K 35/23* (2024.01); *B60K 35/28* (2024.01); *B60K 35/60* (2024.01); *B60K 35/65* (2024.01); *B60K 2360/166* (2024.01); *B60K 2360/168* (2024.01); *B60K 2360/169* (2024.01); *B60K 2360/177* (2024.01); *B60K 2360/179* (2024.01); *B60K 2360/21* (2024.01); *B60K 2360/31* (2024.01);
(Continued)

(58) Field of Classification Search
CPC .......... E02F 9/261; E02F 9/264; B60K 35/00; B60K 2370/1529; B60K 2370/169; B60K 2370/177; B60K 2370/31; B60K 2370/334; B60K 2370/179; B60K 2370/166; B60K 2370/21; B60K 2370/741; B60K 2370/785
See application file for complete search history.

(56) References Cited

U.S. PATENT DOCUMENTS

| 8,918,246 B2 | 12/2014 | Friend |
| 2014/0188333 A1* | 7/2014 | Friend ..................... E02F 9/261 |
| | | 701/34.4 |

(Continued)

FOREIGN PATENT DOCUMENTS

JP 2017-186901 A 10/2017

OTHER PUBLICATIONS

Extended European Search Report for Application No. 21205781.4-1012, mailed Mar. 10, 2022, 7 pages.

*Primary Examiner* — Douglas M Wilson
(74) *Attorney, Agent, or Firm* — Kilpatrick Townsend & Stockton LLP

(57) ABSTRACT

Disclosed are techniques for displaying AR elements on a display system of a construction machine. A position of the construction machine in a world reference frame is detected. An orientation of the construction machine is detected. A position of an operator of the construction machine in a machine reference frame is detected. A position of the operator in the world reference frame is determined based on the position of the operator in the machine reference frame, the position of the construction machine in the world reference frame, and the orientation of the construction machine. The AR elements are generated based on the position of the operator in the world reference frame and a position of the display system in the world reference frame. The AR elements are then displayed on the display system.

17 Claims, 10 Drawing Sheets

(51) Int. Cl.
B60K 35/65 (2024.01)
E02F 9/26 (2006.01)

(52) U.S. Cl.
CPC .. *B60K 2360/334* (2024.01); *B60K 2360/741* (2024.01); *B60K 2360/785* (2024.01)

(56) References Cited

U.S. PATENT DOCUMENTS

| | | | |
|---|---|---|---|
| 2016/0193920 A1* | 7/2016 | Tsubone | B60K 35/00 |
| | | | 701/36 |
| 2018/0144523 A1* | 5/2018 | Edelman | G06F 3/011 |
| 2018/0251961 A1* | 9/2018 | France | B60R 1/00 |
| 2020/0263395 A1* | 8/2020 | Ohiwa | E02F 3/435 |
| 2022/0049476 A1* | 2/2022 | Kurokami | G06F 3/14 |

* cited by examiner

HIGH-ACCURACY AUGMENTED REALITY DISPLAY FOR CONSTRUCTION MACHINES

BACKGROUND OF THE INVENTION

Augmented reality (AR) technologies allow real-world objects to be enhanced by computer-generated information. Merely as an example application, in the construction industry, AR devices are used where digital models of buildings or other structures can be presented on a display while a user is viewing the exact position where the building or structure will be built (or is being built). The digital model can be georeferenced so that it is presented in the proper location and with the proper size and orientation.

Many AR devices are in the form of goggles or a heads-up display worn by the user. Such devices typically use a number of different sensors to track position and orientation (or pose), and they typically use a number of different lenses to project the digital model for viewing by the user. As an example, a head-mounted device such as the HoloLens may include a motion sensor (e.g., an inertial measurement unit (IMU)) along with image sensors (e.g., cameras) to track tilt and rotation of a user's head so that a digital model, or a portion of a digital model, can be correctly displayed depending on where the user is looking.

Despite the progress of AR technologies, linking AR devices and systems to high-accuracy positioning data has proven to be difficult. Furthermore, many AR solutions are unsuitable for use in the construction industry due to, for example, safety requirements imposed on machine operators. Accordingly, there is a need in the art for improved methods and systems related to AR technology.

BRIEF SUMMARY OF THE INVENTION

Embodiments described herein relate generally to augmented reality (AR) systems and methods. More particularly, embodiments relate to an AR display system that allows AR elements to be displayed on a windshield of a construction machine with high accuracy. While embodiments are generally described in reference to construction machines, the present invention is applicable to a wide range of applications in which it would be useful for AR elements to be displayed on a glass, windshield, or other transparent or semi-transparent mediums.

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of displaying augmented reality (AR) elements on a display system of a construction machine, the method comprising: detecting a position of the construction machine in a world reference frame; detecting an orientation of the construction machine; detecting a position of an operator of the construction machine in a machine reference frame; determining a position of the operator in the world reference frame based on the position of the operator in the machine reference frame, the position of the construction machine in the world reference frame, and the orientation of the construction machine; generating the AR elements based on the position of the operator in the world reference frame and a position of the display system in the world reference frame; and displaying the AR elements on the display system.

Example 2 is the method of example(s) 1, wherein the display system includes a projector that projects the AR elements onto a windshield of the construction machine.

Example 3 is the method of example(s) 1-2, wherein the position of the construction machine in the world reference frame is detected using a machine position sensor that is mounted to the construction machine.

Example 4 is the method of example(s) 3, wherein the machine position sensor is a Global Navigation Satellite System (GNSS) receiver.

Example 5 is the method of example(s) 1-4, wherein the orientation of the construction machine is detected using a machine orientation sensor that is mounted to the construction machine.

Example 6 is the method of example(s) 1-5, wherein the position of the operator in the machine reference frame is detected using an operator position sensor that is mounted to the construction machine.

Example 7 is the method of example(s) 6, wherein the operator position sensor is a camera that is configured to capture an image of the operator.

Example 8 is the method of example(s) 1-7, wherein the AR elements include a design virtual element corresponding to a design to be carried out by the operator using the construction machine.

Example 9 is the method of example(s) 1-8, wherein the AR elements include an implement virtual element corresponding to a position of an implement of the construction machine.

Example 10 is the method of example(s) 1-9, wherein the AR elements include a world virtual element corresponding to a position of a real-world object surrounding the construction machine.

Example 11 is a system for displaying augmented reality (AR) elements on a display system of a construction machine, the system comprising: one or more processors; and a computer-readable medium comprising instructions that, when executed by the one or more processors, cause the one or more processors to perform operations comprising: detecting a position of the construction machine in a world reference frame; detecting an orientation of the construction machine; detecting a position of an operator of the construction machine in a machine reference frame; determining a position of the operator in the world reference frame based on the position of the operator in the machine reference frame, the position of the construction machine in the world reference frame, and the orientation of the construction machine; generating the AR elements based on the position of the operator in the world reference frame and a position of the display system in the world reference frame; and displaying the AR elements on the display system.

Example 12 is the system of example(s) 11, wherein the display system includes a projector that projects the AR elements onto a windshield of the construction machine.

Example 13 is the system of example(s) 11-12, wherein the position of the construction machine in the world reference frame is detected using a machine position sensor that is mounted to the construction machine.

Example 14 is the system of example(s) 13, wherein the machine position sensor is a Global Navigation Satellite System (GNSS) receiver.

Example 15 is the system of example(s) 11-14, wherein the orientation of the construction machine is detected using a machine orientation sensor that is mounted to the construction machine.

Example 16 is a non-transitory computer-readable medium comprising instructions that, when executed by one or more processors, cause the one or more processors to perform operations for displaying augmented reality (AR) elements on a display system of a construction machine, the operations comprising: detecting a position of the construction machine in a world reference frame; detecting an orientation of the construction machine; detecting a position of an operator of the construction machine in a machine reference frame; determining a position of the operator in the world reference frame based on the position of the operator in the machine reference frame, the position of the construction machine in the world reference frame, and the orientation of the construction machine; generating the AR elements based on the position of the operator in the world reference frame and a position of the display system in the world reference frame; and displaying the AR elements on the display system.

Example 17 is the non-transitory computer-readable medium of example(s) 16, wherein the display system includes a projector that projects the AR elements onto a windshield of the construction machine.

Example 18 is the non-transitory computer-readable medium of example(s) 16-17, wherein the position of the construction machine in the world reference frame is detected using a machine position sensor that is mounted to the construction machine.

Example 19 is the non-transitory computer-readable medium of example(s) 18, wherein the machine position sensor is a Global Navigation Satellite System (GNSS) receiver.

Example 20 is the non-transitory computer-readable medium of example(s) 16-19, wherein the orientation of the construction machine is detected using a machine orientation sensor that is mounted to the construction machine.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

Embodiments described herein provide for systems, methods, and other techniques for displaying augmented reality (AR) elements within a cab of a construction machine. The displayed elements can be projected onto the front glass or screen within the vehicle cab using a projector. A disclosed system can track the position of the operator's head (e.g., specifically the operator's eyes) and determine locations along the display system for displaying the AR elements so that they appear aligned with either the real-world or the design objects with which they are associated.

In some instances, an intersection point along the display system of a projected line between the user's eyes and the real-world or design object is determined and is used when generating the AR elements. To ensure that such a projection is performed with high-accuracy, a three-dimensional (3D) position of the construction machine in the world coordinate frame may be detected using a Global Navigation Satellite System (GNSS) receiver mounted to the vehicle's roof. The spatial offset between the position detected using the GNSS receiver and the position of a camera that detects the position of the operator's head and/or eyes may be known. As described herein, this relationship may be leveraged to resolve the operator's position in the world reference frame and, in a similar manner, the display system's position in the world reference frame.

Figure 1A:
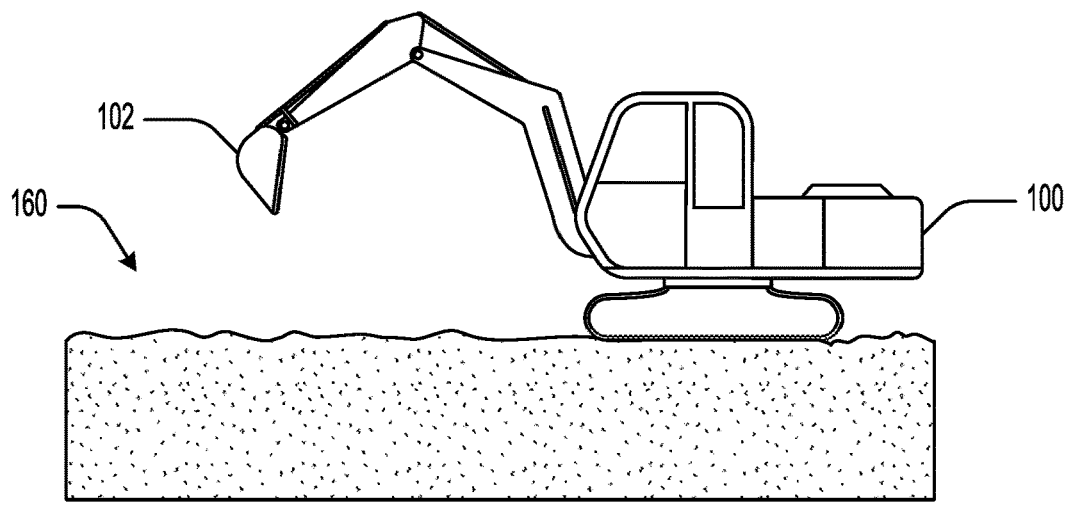
FIGS. 1A-1C illustrate an example of a construction machine operating within a construction site.
Figure 1B:
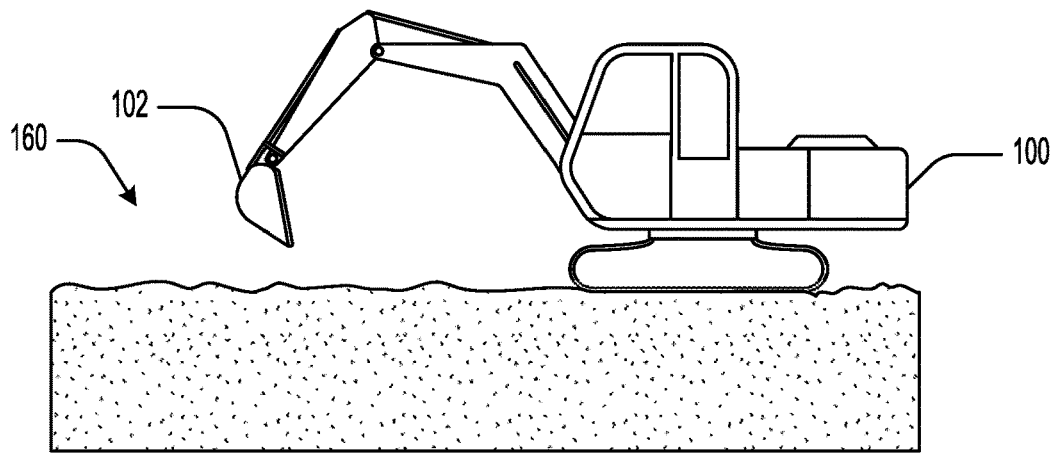
Figure 1C:
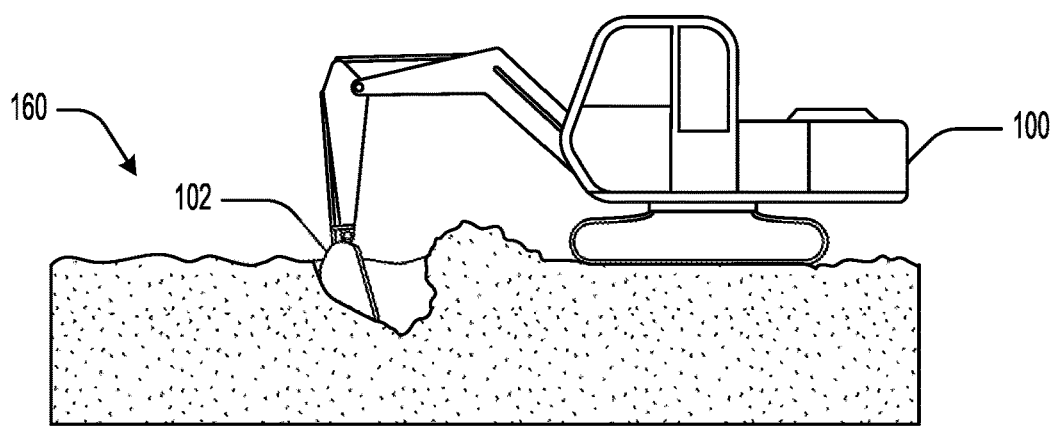

FIGS. 1A-1C illustrate an example of a construction machine 100 operating within a construction site 160, according to some embodiments. FIG. 1A shows construction machine 100 arriving at a location at construction site 160 at which earth is to be removed. The construction machine's implement 102 is held a few meters above the ground near the location at which earth is to be removed. FIG. 1B shows construction machine 100 lowering its implement 102 toward the ground such that implement 102 is positioned directly above the location at which earth is to be removed. FIG. 1C shows implement 102 moving below the ground level and digging up an amount of earth in accordance with a desired design or plan. For example, an operator of construction machine 100 may be carrying out a design that indicates that a two meter trench is to be dug at construction site 160.

In various embodiments described herein, the operator of construction machine 100 may be assisted by the display of AR elements on a display system within construction machine 100. Such AR elements may assist the operator in carrying out the design by, for example, providing AR elements indicating (e.g., aligned with) features of the construction design (referred to as design virtual elements), AR elements indicating (e.g., aligned with) the position of implement 102 (referred to as implement virtual elements), AR elements indicating (e.g., aligned with) indicating the position of real-world objects, such as the ground (referred to real-world virtual elements), and/or AR elements indicating relationships between the above-mentioned AR elements.

While construction site 160 is generally described herein as corresponding to an earthmoving site such as a road or building construction site, the present disclosure is applicable to a wide variety of construction projects. Similarly, while construction machine 100 is generally described herein and is depicted as corresponding to an earthmoving construction machine, particularly an excavator, the various techniques described herein are applicable to a wide variety of construction machines or heavy equipment such as graders, bulldozers, backhoes, pavers (e.g., concrete, asphalt, slipform, vibratory, etc.), compactors, scrapers, loaders, material handlers, combine harvesters, spreaders, and the like. Similarly, while implement 102 is generally described herein and is depicted as corresponding to a bucket of an excavator, implement 102 may be any component of a construction machine that is controlled to carry out a design and/or is viewable by the operator of construction machine 100. For example, implement 102 may be the blade of a bulldozer, the drum of a compactor, the header of a combine harvester, the boom of a spreader, the screed of an asphalt paver, among other possibilities.

In some embodiments, construction machine 100 may include a tractor with wheels, axles, and a gasoline-, diesel-, electric-, or steam-powered engine for providing power and traction to the construction machine to drive along a desired path, often at a constant speed. An operator of construction machine 100 may provide inputs to a control unit using various input devices such as levers, switches, buttons, pedals, steering wheels, and touch screens, which can cause various actuators to move construction machine.

Figure 2A:
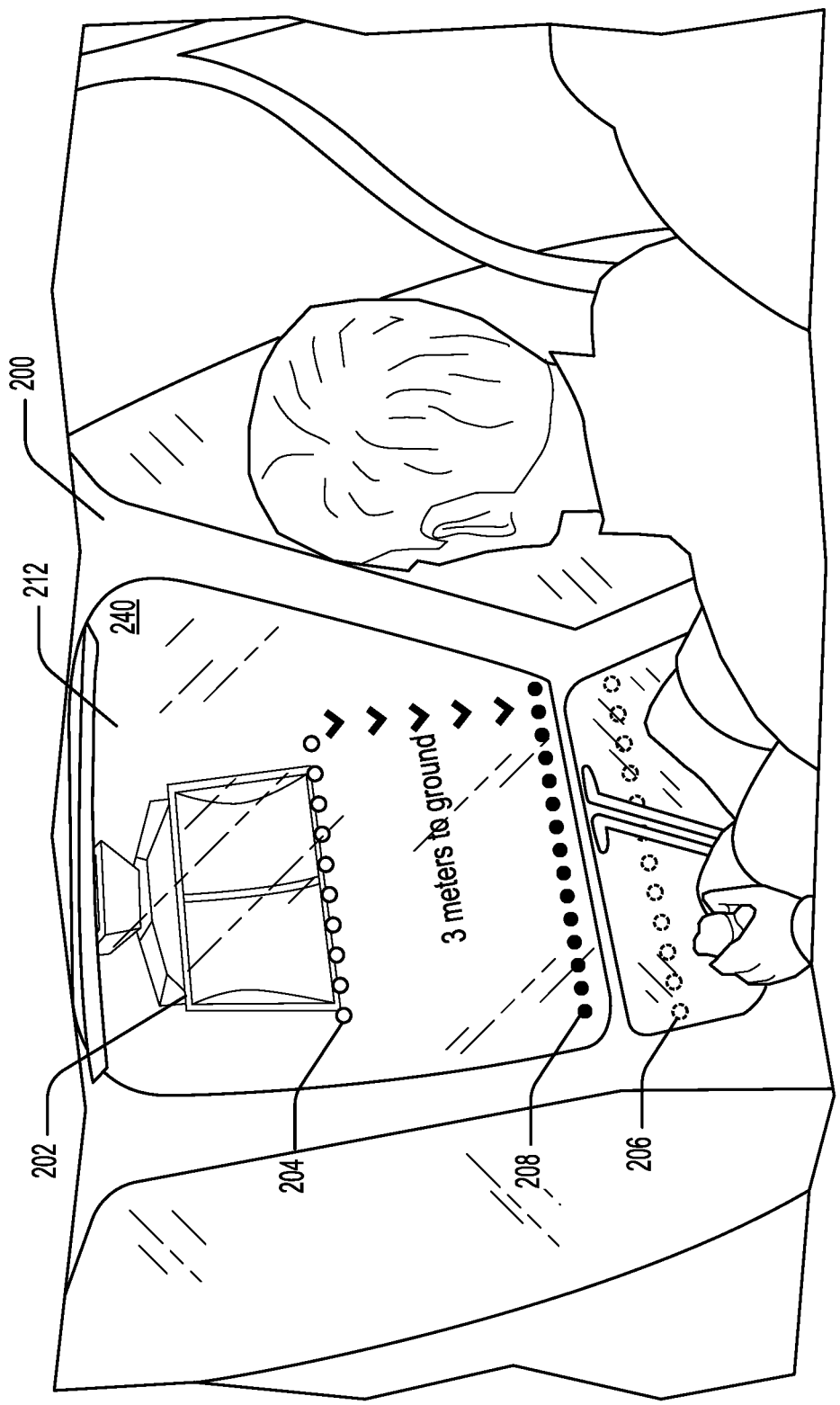
FIGS. 2A-2C illustrate an operator's view inside a cab while a construction machine is operating within a construction site.
Figure 2B:
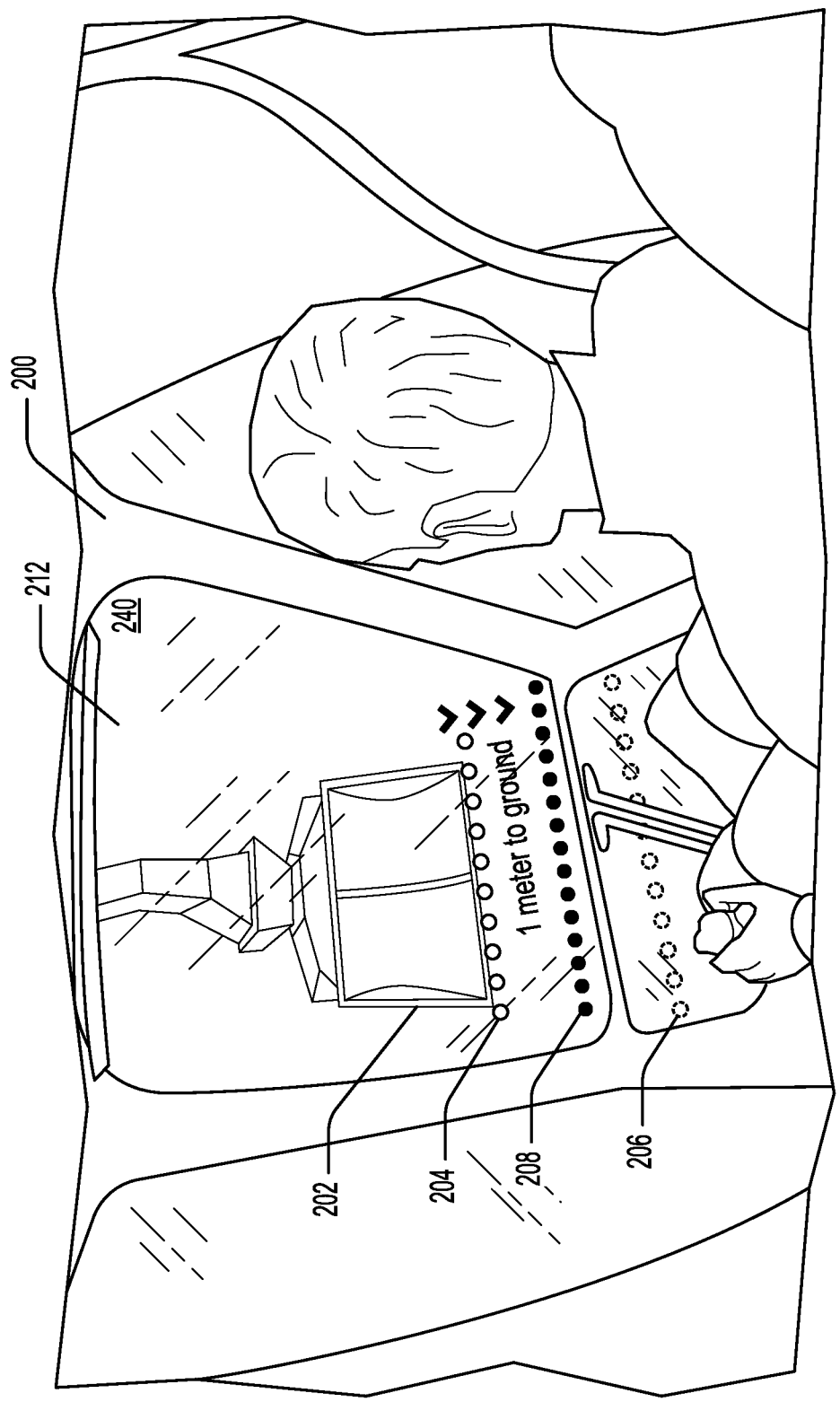
Figure 2C:
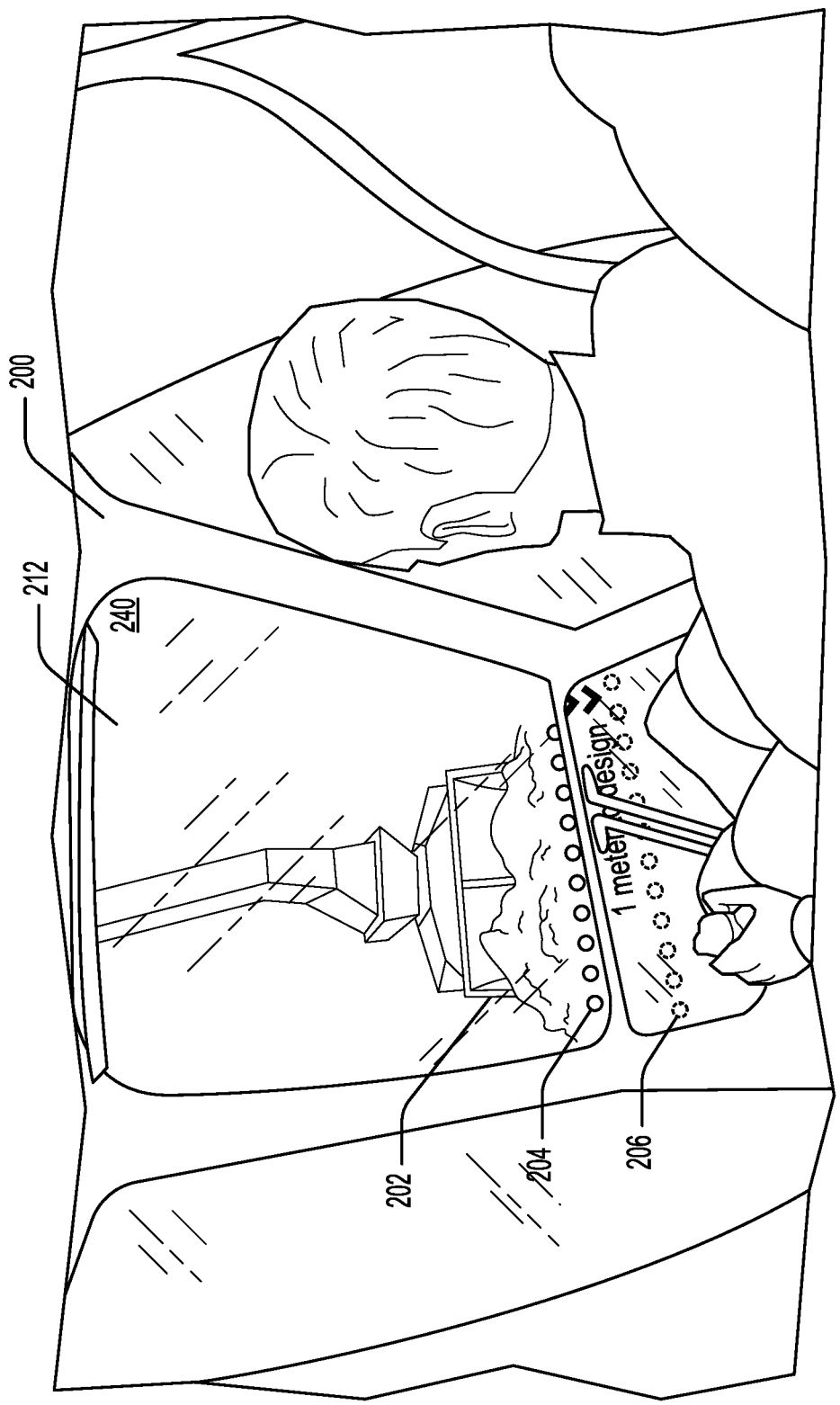

FIGS. 2A-2C illustrate an operator's view inside a cab while a construction machine 200 is operating within a construction site, according to some embodiments. For example, FIGS. 2A-2C may correspond to FIGS. 1A-1C, respectively. FIG. 2A shows various AR elements being displayed on a display system 212, which includes the cab glass 240 (e.g., the windshield) in front of the operator. In some embodiments, display system 212 may further include a projector that projects images onto cab glass 240. The projector may project light at a distance, for example, from above the operator's head or elsewhere in the cab or outside the cab toward cab glass 240. For example, the projector may be mounted to a roof above the operator's head and may be oriented to project light toward and onto cab glass 240.

It should be understood that embodiments of the present disclosure are not limited to projector-based displays. For example, in some embodiments, display system 212 may include any of a variety of flat-panel displays using liquid-crystal display (LCD), light emitting diode (LED), plasma panel, and/or electroluminescent display (ELD) technologies. In some embodiments, display system 212 may include light-projection components that are integrated with and/or coupled to cab glass 240 or another optical layer (e.g., a waveguide) that is positioned in front of, behind, or within cab glass 240. For example, display system 212 may include diffractive waveguides with a variety of gratings that are configured to outcouple light from the waveguide toward the operator's eyes.

The displayed AR elements in FIG. 2A include an implement virtual element 204 that is aligned with a bottom edge of an implement 202 of construction machine 200 from the operator's perspective. In various embodiments, implement virtual element 204 may be aligned with and/or indicate the outer boundary of implement 202, a center point of implement 202, a point of interest along implement 202, an interaction region of implement 202 (e.g., the bottom edge of implement 202 where implement 202 first interfaces with the ground), among other possibilities.

The displayed AR elements further include a world virtual element 208 that is aligned with the surface of the ground from the operator's perspective. In some embodiments, world virtual element 208 may be generated such that it is aligned with the ground directly below implement 202 such that the operator can determine at which point along the ground implement 202 will come into contact with the ground. Alternatively or additionally, world virtual element 208 may be generated such that it is aligned with the ground at a point where implement 202 will come into contact with the ground if the control settings continue in their current state (e.g., considering the direction or angle at which implement 202 is approaching the ground). In some embodiments, world virtual element 208 may be generated such that it is aligned with the ground at a point as dictated by the design. For example, world virtual element 208 may be aligned with the ground at a current cutting position for carrying out the design.

The displayed AR elements further include a design virtual element 206 that is aligned with a design (e.g., a desired depth) from the operator's perspective. For example, design virtual element 206 may be aligned with the locations of a two meter trench is to be dug at the construction site. In some embodiments, design virtual element 206 may be generated such that it is aligned with the design directly below implement 202 such that the operator can determine the design for the current position of implement 202. The AR elements may be displayed alongside each other and may be distinguished from each other by different colors, sizes, shapes, among other possibilities.

In some embodiments, additional AR elements may be displayed to show the relationships between implement virtual element 204, world virtual element 208, and design virtual element 206. Such AR elements may be referred to as relationship virtual elements and, in some embodiments, may correspond to instructions to allow the operator to carry out the design. In some embodiments, a first relationship virtual element may be displayed as an indicator between implement virtual element 204 and world virtual element 208, such as a downward arrow or a set of downward arrows, when implement 202 is above the ground. This is illustrated in each of FIGS. 2A-2B. After implement 202 has begun digging into the ground, the first relationship virtual element may be replaced by a second relationship virtual element, which may be an indicator between implement virtual element 204 and design virtual element 206, such as a downward arrow or a set of downward arrows. This is illustrated in FIG. 2C. In this manner, the operator of construction machine 200 is assisted in carrying out the design without the operator having to look away or remove their attention from the current position of implement 202, thereby improving the safety and efficiency of the construction operation.

Figure 3:
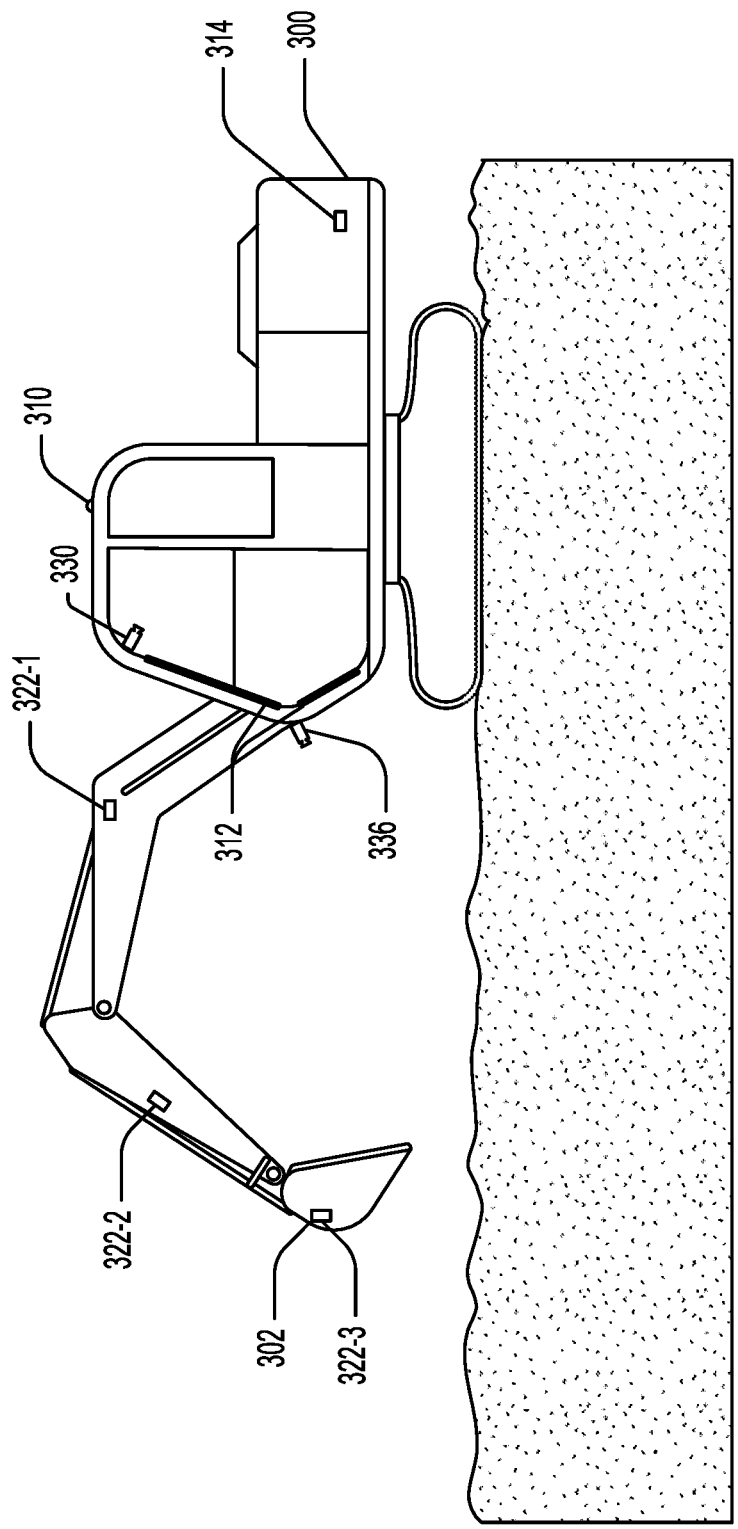
FIG. 3 illustrates an example of a construction machine along with various sensors and other devices incorporated therein.

FIG. 3 illustrates an example of a construction machine 300 along with various sensors and other devices incorporated therein, according to some embodiments. In the illustrated example, construction machine 300 includes a machine position sensor 310 mounted to the cab of construction machine 300, a machine orientation sensor 314 mounted to construction machine 300 (e.g., the cab of construction machine 300), a first implement orientation sensor 322-1 mounted to a first arm element of construction machine 300, a second implement orientation sensor 322-2 mounted to a second arm element of construction machine 300, and a third implement orientation sensor 322-3 mounted to an implement 302 of construction machine 300.

In various embodiments, machine position sensor 310 may be a GNSS receiver or any other device for detecting a geospatial position, machine orientation sensor 314 may be an inertial measurement unit (IMU) or any other device for detecting rotational movement, first implement orientation sensor 322-1 may be an IMU or any other device for detecting rotational movement, second implement orientation sensor 322-2 may be an IMU or any other device for detecting rotational movement, and third implement orientation sensor 322-3 may be an IMU or any other device for detecting rotational movement.

In various implementations, any of the IMUs may be devices capable of detecting acceleration, angular rate, and/or angular position. For example, an IMU may include one or more accelerometers, one or more gyroscopes, and/or one or more magnetometers, among other possibilities. In some embodiments, an IMU can be used to determine the yaw angle (rotation angle with respect to a vertical axis), the pitch angle (rotation angle with respect to a transverse axis), and/or the roll angle (rotation angle with respect to a longitudinal axis).

In some embodiments, an operator position sensor 330 may be mounted to construction machine 300 to capture data indicative of the position of the operator of construction machine 300 (e.g., the position of the operator's head and/or eyes). In various embodiments, operator position sensor 330 may be a camera or any other image capture device. Operation position sensor 330 may further perform eye tracking to determine whether the operator's eyes are focused at display system 312 and also which specific portions of display system 312 they are currently focused at. Based on the eye tracking data, portions of display system 312 may be activated or deactivated based on the operator's engagement (e.g., portions where the operator is looking may be activated and portions where the operator is not looking may be deactivated). Activated portions may display AR elements while deactivated portions may disable the display of AR elements. In some embodiments, operator position sensor 330 may be a LIDAR sensor or any other device for generating depth maps that include depths corresponding to the operator. Other possibilities are contemplated and are considered to be within the scope of the present disclosure.

In some embodiments, a world sensor 336 may be mounted to construction machine 300 to capture data indicative of the positions of real-world objects surrounding construction machine 300, such as the ground or other terrain. In various embodiments, world sensor 336 may be a camera or any other image capture device. In some embodiments, world sensor 336 may be a LIDAR sensor or any other device for generating depth maps that include depths corresponding to the real-world objects surrounding construction machine 300. Other possibilities are contemplated and are considered to be within the scope of the present disclosure.

Figure 4:
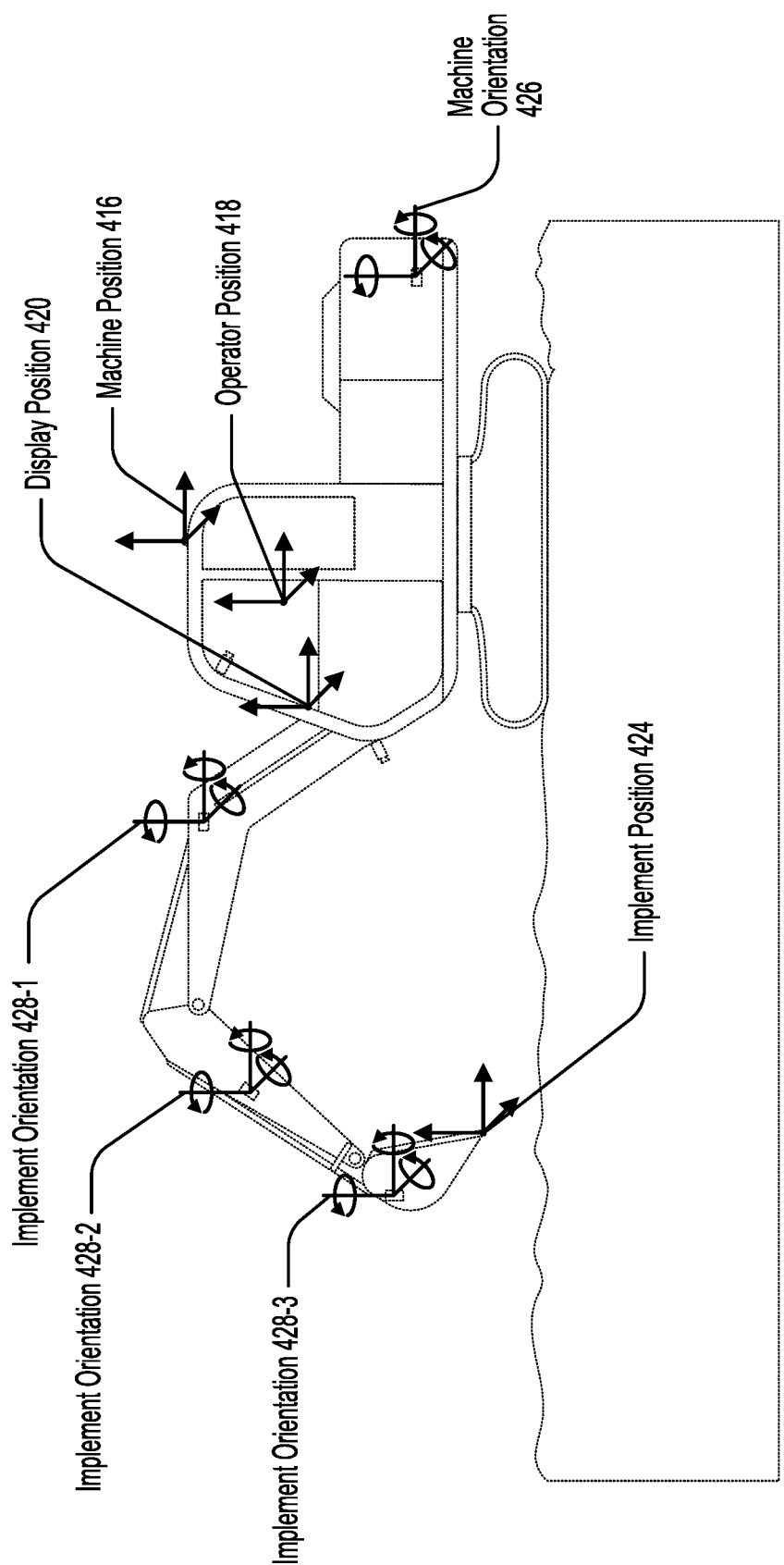
FIG. 4 illustrates an example of various types of data that may be detected using the sensors described in reference to FIG. 3.

FIG. 4 illustrates an example of the various types of data that may be detected using the sensors described in reference to FIG. 3, according to some embodiments. The data includes a machine position 416 detected using machine position sensor 310, a machine orientation 426 detected using machine orientation sensor 314, an operator position 418 detected using operator position sensor 330, a display position 420 determined based on machine position 416 and machine orientation 426, a first implement orientation 428-1 detected using first implement orientation sensor 322-1, a second implement orientation 428-2 detected using second implement orientation sensor 322-2, a third implement orientation 428-3 detected using third implement orientation sensor 322-3, and an implement position 424 determined based on machine position 416, machine orientation 426, first implement orientation 428-1, second implement orientation 428-2, and third implement orientation 428-3.

In various embodiments, machine position 416 may include a 3D coordinate (e.g., X, Y, and Z), machine orientation 426 may include a 3D coordinate (e.g., pitch, yaw, and roll), operator position 418 may include a 3D coordinate (e.g., X, Y, and Z), display position 420 may include a 3D coordinate (e.g., X, Y, and Z), first implement orientation 428-1 may include a 3D coordinate (e.g., pitch, yaw, and roll), second implement orientation 428-2 may include a 3D coordinate (e.g., pitch, yaw, and roll), third implement orientation 428-3 may include a 3D coordinate (e.g., pitch, yaw, and roll), and implement position 424 may include a 3D coordinate (e.g., X, Y, and Z).

Figure 5:
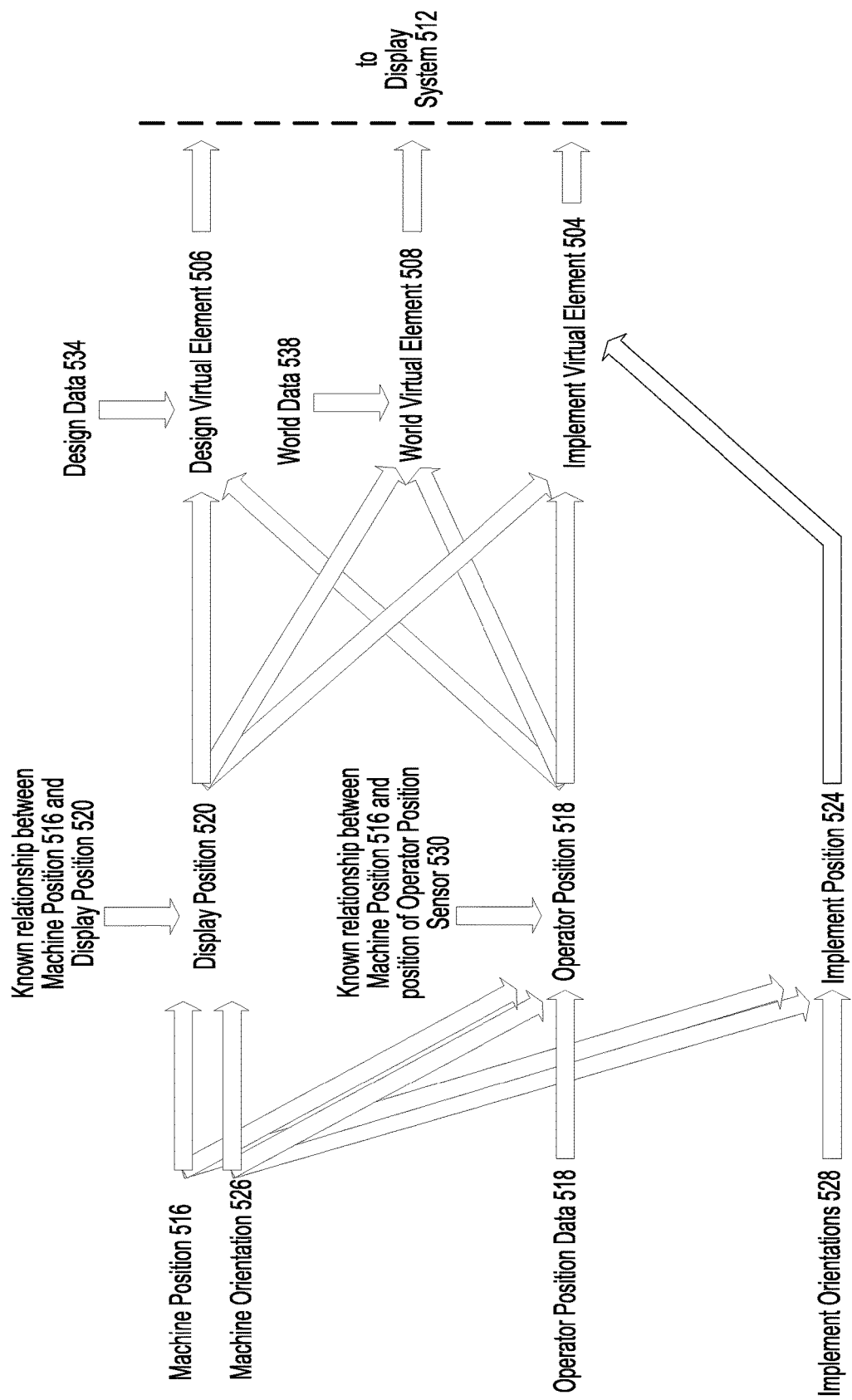
FIG. 5 illustrates an example of the relationships between the various types of data that may be detected and how they are used to generate augmented reality (AR) elements.

FIG. 5 illustrates an example of the relationships between the various types of data that may be detected and how they are used to generate AR elements, according to some embodiments. In the illustrated example, a machine position 516, a machine orientation 526, operator position data 518, and implement orientations 528 are detected using the sensors of the construction machine. In some embodiments, a display position 520 may be determined based on machine position 516, machine orientation 526, and a known relationship between machine position 516 and display position 520. In some embodiments, an operator position 518 may be determined based on machine position 516, machine orientation 526, operator position data 518, and a known relationship between machine position 516 and a position of an operator position sensor 530 that was used to detect operator position data 518.

In some embodiments, an implement position 524 may be determined based on machine position 516, machine orientation 526, and implement orientations 528. In some embodiments, a design virtual element 506 is generated based on display position 520, operator position 518, and design data 534 that is received by the construction machine. In some embodiments, a world virtual element 508 is generated based on display position 520, operator position 518, and world data 538 that is received/detected by the construction machine. In some embodiments, an implement virtual element 504 is generated based on display position 520, operator position 518, and implement position 524. The generated AR elements are then sent to a display system 512 to be displayed for viewing by the operator of the construction machine.

Figure 6:
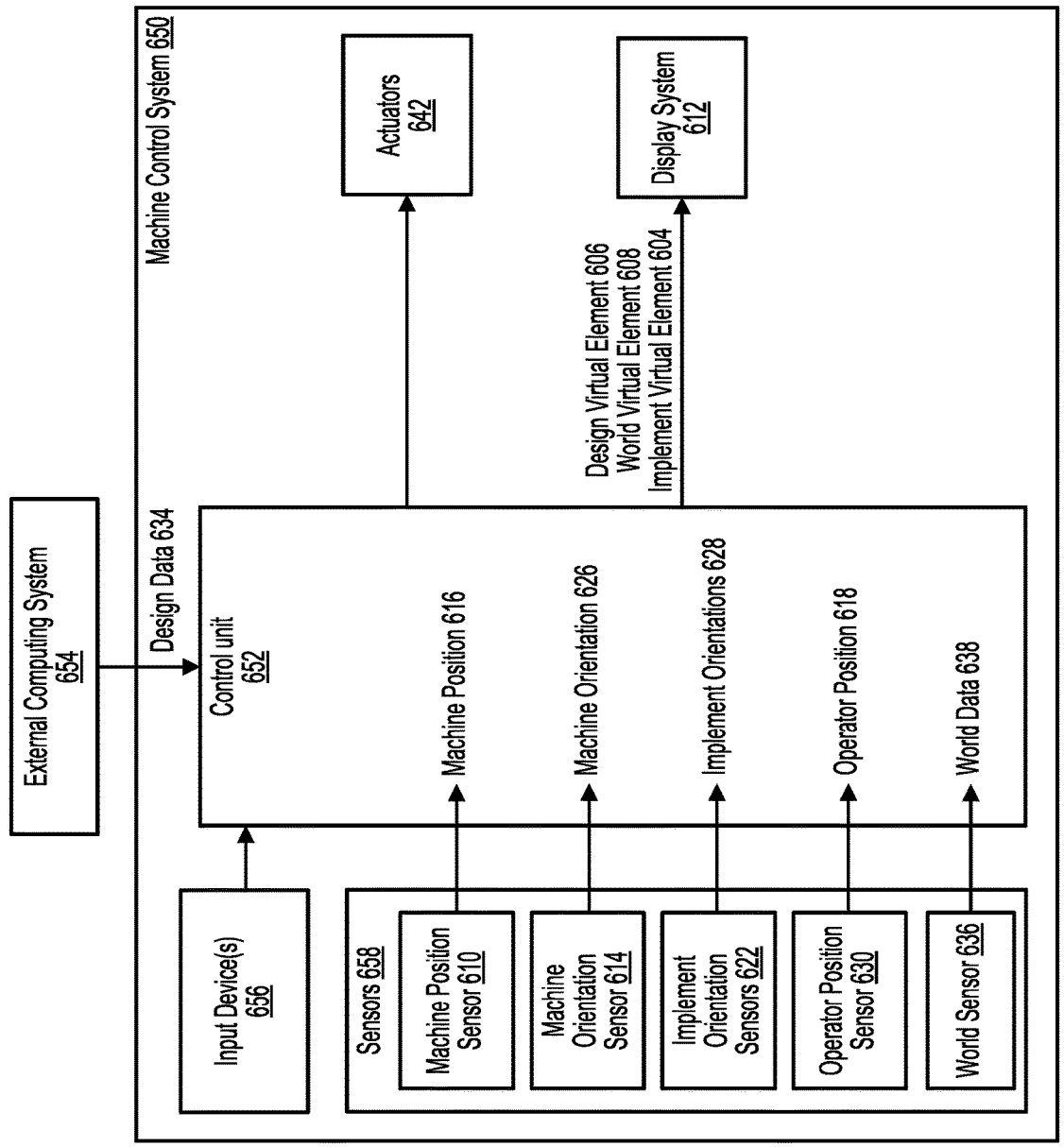
FIG. 6 illustrates an example of a machine control system.

FIG. 6 illustrates an example of a machine control system 650, according to some embodiments. Machine control system 650 may include various input device(s) 656, sensors 658, actuators 642, and a display system 612 for allowing an operator of a construction machine to carry out a design. The components of machine control system 650 may be mounted to or integrated with the components of the construction machine such that the construction machine may be considered to include machine control system 650. The illustrated components of machine control system 650 may be communicatively coupled to each other via one or more wired and/or wireless connections.

Machine control system 650 may include a control unit 652 that receives data from input device(s) 656 and sensors 658 and generates commands that are sent to actuators 642 and AR elements that are sent to display system 612. Control unit 652 may include one or more processors and an associated memory. In some embodiments, control unit 652 may be communicatively coupled to an external computing system 654 located external to machine control system 650 and the construction machine. In some instances, external computing system 654 may send design data 634 to control unit 652 regarding the details of a construction project. External computing system 654 may also send alerts and other general information to control unit 652, such as traffic conditions, weather conditions, the locations and statuses of material transfer vehicles, and the like.

In the illustrated example, sensors 658 include a machine position sensor 610 used to detect a machine position 616, a machine orientation sensor 614 used to detect a machine orientation 626, implement orientation sensors 622 used to detect implement orientations 628, an operator position sensor 630 used to detect an operator position 618, and a world sensor 636 used to detect world data 638. These detected data are processed and used by control unit 652 to generate a design virtual element 606, a world virtual element 608, and an implement virtual element 604, which are sent to be displayed on display system 612.

Figure 7:
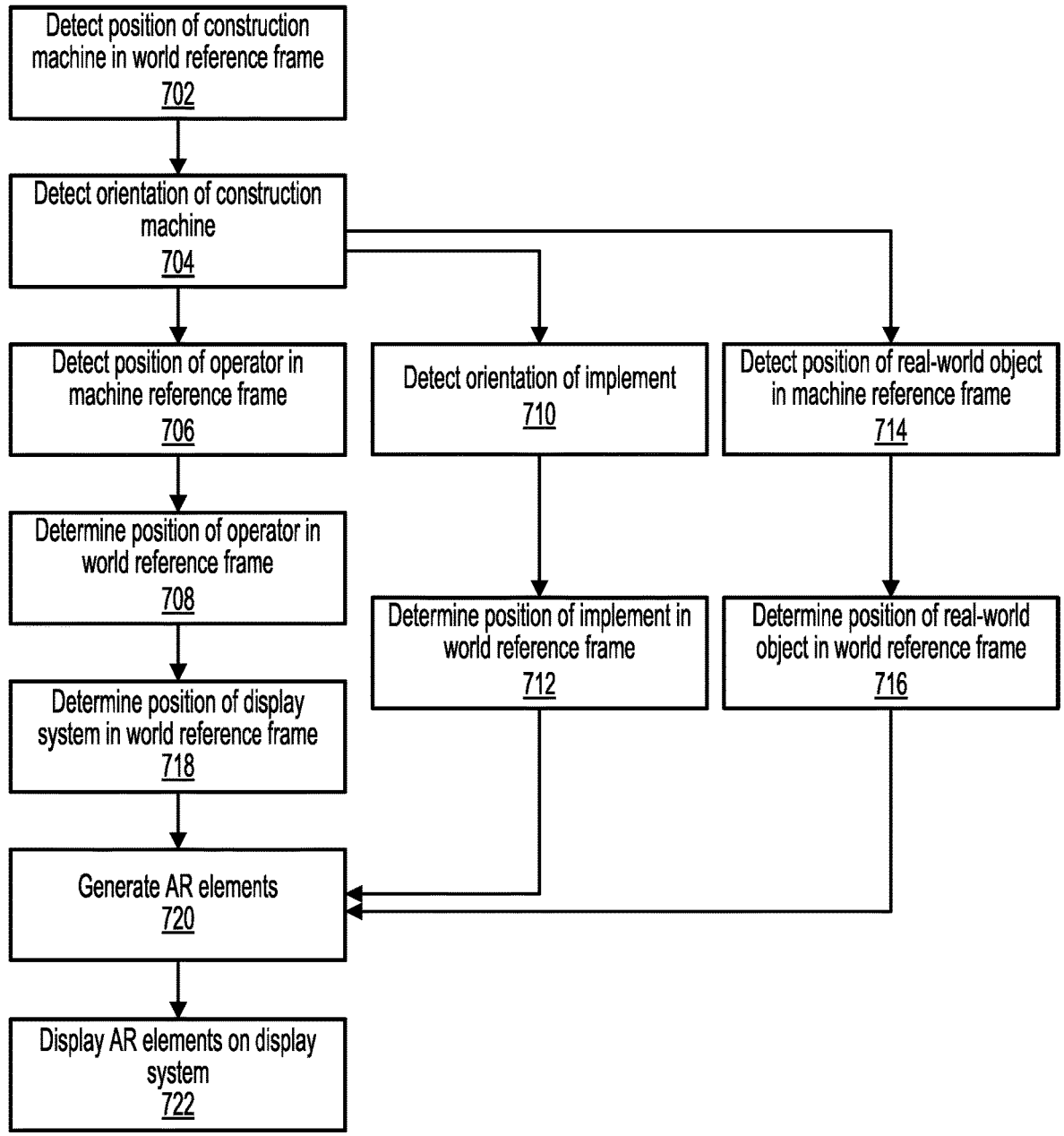
FIG. 7 illustrates an example of a method of displaying AR elements on a display system of a construction machine.

FIG. 7 illustrates a method 700 of displaying AR elements on a display system (e.g., display systems 212, 312, 612) of a construction machine (e.g., construction machines 100, 200, 300), according to some embodiments. One or more steps of method 700 may be omitted during performance of method 700, and steps of method 700 need not be performed in the order shown. One or more steps of method 700 may be performed by one or more processors, such as those included in a control unit (e.g., control unit 652) of a machine control system (e.g., machine control system 650). Method 700 may be implemented as a computer-readable medium or computer program product comprising instructions which, when the program is executed by one or more computers, cause the one or more computers to carry out the steps of method 700. Such computer program products can be transmitted, over a wired or wireless network, in a data carrier signal carrying the computer program product.

At step 702, a position (e.g., machine positions 416, 516, 616) of the construction machine in a world reference frame is detected. In some embodiments, the position of the construction machine in the world reference frame is detected using a machine position sensor (e.g., machine position sensors 310, 610) that is mounted to the construction machine.

At step 704, an orientation (e.g., machine orientations 426, 526, 626) of the construction machine is detected. In some embodiments, the orientation of the construction machine is detected using a machine orientation sensor (e.g., machine orientation sensor 314, 614) that is mounted to the construction machine.

At step 706, a position (e.g., operator positions 418, 518, 618) of an operator of the construction machine in a machine reference frame is detected. In some embodiments the position of the operator in the machine reference frame is detected using an operator position sensor (e.g., operator position sensor 330, 530, 630) that is mounted to the construction machine.

At step 708, a position (e.g., operator positions 418, 518, 618) of the operator in the world reference frame is determined based on the position of the operator in the machine reference frame, the position of the construction machine in the world reference frame, the orientation of the construction machine, and a known relationship between the position of the construction machine and the position of the operator position sensor.

At step 710, one or more orientations (e.g., implement orientations 428, 528, 628) of an implement (e.g., implements 102, 202, 302) of the construction machine are detected. In some embodiments, the one or more orientations of the implement are detected using one or more implement orientation sensors (e.g., implement orientation sensors 322, 622) that are mounted to the construction machine. In some embodiments, a first implement orientation sensor may be mounted to a first arm of the construction machine, a second implement orientation sensor may be mounted to a second arm of the construction machine, and a third implement orientation sensor may be mounted to the implement. In some embodiments, the implement may be mechanically coupled to a cab or main chassis of the construction machine via the first arm and the second arm.

At step 712, a position (e.g., implement positions 424, 524) of the implement in the world reference frame is determined. In some embodiments, the position of the implement in the world reference frame is determined based on the position of the construction machine in the world reference frame, the orientation of the construction machine, and the one or more orientations of the implement.

At step 714, a position of a real-world object in the machine reference frame is detected. In some embodiments, the position of the real-world object in the machine reference frame is detected using a world sensor (e.g., world sensors 336, 636) that is mounted to the construction machine.

At step 716, a position of the real-world object in the world reference frame is determined. In some embodiments, the position of the real-world object in the world reference frame is determined based on the position of the real-world object in the machine reference frame, the position of the construction machine in the world reference frame, the orientation of the construction machine, and a known relationship between the position of the construction machine and the position of the world sensor.

At step 718, a position (e.g., display positions 420, 520) of the display system in the world reference frame is determined. In some embodiments, the position of the display system in the world reference frame is determined based on the position of the construction machine in the world reference frame, the orientation of the construction machine, and a known relationship between the position of the construction machine and the position of the display system.

At step 720, the AR elements are generated based on the position of the operator in the world reference frame and the position of the display system in the world reference frame. In some embodiments, the AR elements include a design virtual element (e.g., design virtual elements 206, 506, 606), which may be generated based on design data (e.g., design data 534, 634) received by the construction machine, the position of the display system in the world reference frame, and the position of the operator in the world reference frame. In some embodiments, the AR elements include a world virtual element (e.g., world virtual elements 208, 508, 608), which may be generated based on the position of the real-world object in the world reference frame, the position of the display system in the world reference frame, and the position of the operator in the world reference frame. In some embodiments, the AR elements include an implement virtual element (e.g., implement virtual elements 204, 504, 604), which may be generated based on the position of the implement in the world reference frame, the position of the display system in the world reference frame, and the position of the operator in the world reference frame.

At step 722, the AR elements are displayed on the display system. In some embodiments, displaying the AR elements on the display system includes projecting the AR elements onto a windshield of the construction machine.

Figure 8:
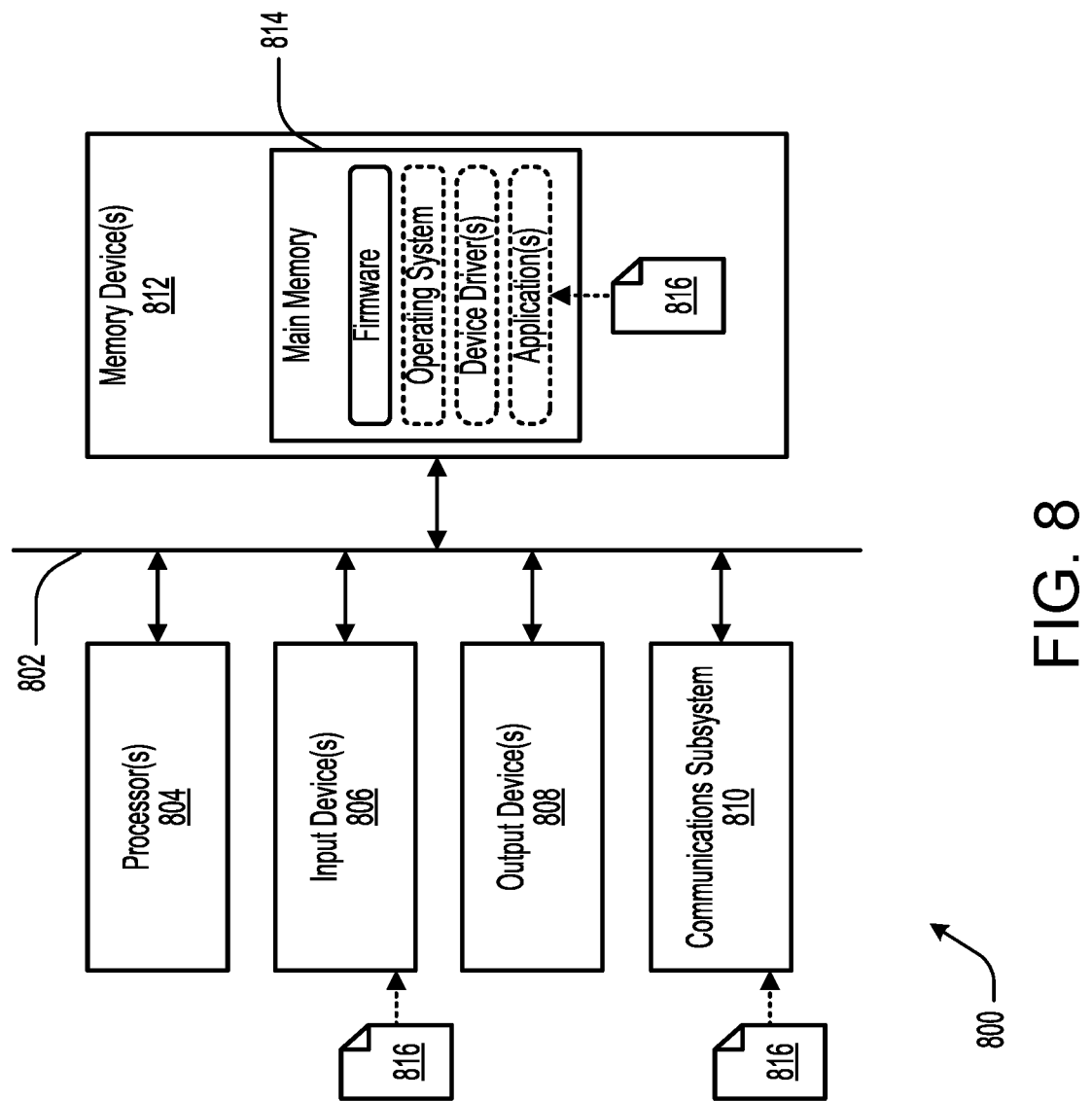
FIG. 8 illustrates an example computer system comprising various hardware elements.

FIG. 8 illustrates an example computer system 800 comprising various hardware elements, according to some embodiments. Computer system 800 may be incorporated into or integrated with devices described herein and/or may be configured to perform some or all of the steps of the methods provided by various embodiments. For example, in various embodiments, computer system 800 may be incorporated into control unit 652 and/or may be configured to perform method 700. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

In the illustrated example, computer system 800 includes a communication medium 802, one or more processor(s) 804, one or more input device(s) 806, one or more output device(s) 808, a communications subsystem 810, and one or more memory device(s) 812. Computer system 800 may be implemented using various hardware implementations and embedded system technologies. For example, one or more elements of computer system 800 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device such as an SoC FPGA, among other possibilities.

The various hardware elements of computer system 800 may be coupled via communication medium 802. While communication medium 802 is illustrated as a single connection for purposes of clarity, it should be understood that communication medium 802 may include various numbers and types of communication media for transferring data between hardware elements. For example, communication medium 802 may include one or more wires (e.g., conductive traces, paths, or leads on a printed circuit board (PCB) or integrated circuit (IC), microstrips, striplines, coaxial cables, etc.), one or more optical waveguides (e.g., optical fibers, strip waveguides, etc.), one or more wireless connections or links (e.g., infrared wireless communication, radio communication, microwave wireless communication, etc.), among other possibilities.

In some embodiments, communication medium 802 may include one or more buses connecting pins of the hardware elements of computer system 800. For example, communication medium 802 may include a bus connecting processor(s) 804 with main memory 814, referred to as a system bus, and a bus connecting main memory 814 with input device(s) 806 or output device(s) 808, referred to as an expansion bus. The system bus may consist of several elements, including an address bus, a data bus, and a control bus. The address bus may carry a memory address from processor(s) 804 to the address bus circuitry associated with main memory 814 in order for the data bus to access and carry the data contained at the memory address back to processor(s) 804. The control bus may carry commands from processor(s) 804 and return status signals from main memory 814. Each bus may include multiple wires for carrying multiple bits of information and each bus may support serial or parallel transmission of data.

Processor(s) 804 may include one or more central processing units (CPUs), graphics processing units (GPUs), neural network processors or accelerators, digital signal processors (DSPs), and/or the like. A CPU may take the form of a microprocessor, which is fabricated on a single IC chip of metal-oxide-semiconductor field-effect transistor (MOSFET) construction. Processor(s) 804 may include one or more multi-core processors, in which each core may read and execute program instructions simultaneously with the other cores.

Input device(s) 806 may include one or more of various user input devices such as a mouse, a keyboard, a microphone, etc., as well as various sensor input devices, such as an image capture device, a pressure sensor (e.g., barometer, tactile sensor, etc.), a temperature sensor (e.g., thermometer, thermocouple, thermistor, etc.), a movement sensor (e.g., accelerometer, gyroscope, tilt sensor, etc.), a light sensor (e.g., photodiode, photodetector, charge-coupled device, etc.), and/or the like. Input device(s) 806 may also include devices for reading and/or receiving removable storage devices or other removable media. Such removable media may include optical discs (e.g., Blu-ray discs, DVDs, CDs, etc.), memory cards (e.g., CompactFlash card, Secure Digital (SD) card, Memory Stick, etc.), floppy disks, Universal Serial Bus (USB) flash drives, external hard disk drives (HDDs) or solid-state drives (SSDs), and/or the like.

Output device(s) 808 may include one or more of various devices that convert information into human-readable form, such as without limitation a display device, a speaker, a printer, and/or the like. Output device(s) 808 may also include devices for writing to removable storage devices or other removable media, such as those described in reference to input device(s) 806. Output device(s) 808 may also include various actuators for causing physical movement of one or more components. Such actuators may be hydraulic, pneumatic, electric, etc., and may be provided with control signals by computer system 800.

Communications subsystem 810 may include hardware components for connecting computer system 800 to systems or devices that are located external computer system 800, such as over a computer network. In various embodiments, communications subsystem 810 may include a wired communication device coupled to one or more input/output ports (e.g., a universal asynchronous receiver-transmitter (UART), etc.), an optical communication device (e.g., an optical modem, etc.), an infrared communication device, a radio communication device (e.g., a wireless network interface controller, a BLUETOOTH® device, an IEEE 802.11 device, a Wi-Fi device, a Wi-Max device, a cellular device, etc.), among other possibilities.

Memory device(s) 812 may include the various data storage devices of computer system 800. For example, memory device(s) 812 may include various types of computer memory with various response times and capacities, from faster response times and lower capacity memory, such as processor registers and caches (e.g., L0, L1, L2, etc.), to medium response time and medium capacity memory, such as random access memory, to lower response times and lower capacity memory, such as solid state drives and hard drive disks. While processor(s) 804 and memory device(s) 812 are illustrated as being separate elements, it should be understood that processor(s) 804 may include varying levels of on-processor memory such as processor registers and caches that may be utilized by a single processor or shared between multiple processors.

Memory device(s) 812 may include main memory 814, which may be directly accessible by processor(s) 804 via the memory bus of communication medium 802. For example, processor(s) 804 may continuously read and execute instructions stored in main memory 814. As such, various software elements may be loaded into main memory 814 to be read and executed by processor(s) 804 as illustrated in FIG. 8. Typically, main memory 814 is volatile memory, which loses all data when power is turned off and accordingly needs power to preserve stored data. Main memory 814 may further include a small portion of non-volatile memory containing software (e.g., firmware, such as BIOS) that is used for reading other software stored in memory device(s) 812 into main memory 814. In some embodiments, the volatile memory of main memory 814 is implemented as random-access memory (RAM), such as dynamic RAM (DRAM), and the non-volatile memory of main memory 814 is implemented as read-only memory (ROM), such as flash memory, erasable programmable read-only memory (EPROM), or electrically erasable programmable read-only memory (EEPROM).

Computer system 800 may include software elements, shown as being currently located within main memory 814, which may include an operating system, device driver(s), firmware, compilers, and/or other code, such as one or more application programs, which may include computer programs provided by various embodiments of the present disclosure. Merely by way of example, one or more steps described with respect to any methods discussed above, might be implemented as instructions 816 executable by computer system 800. In one example, such instructions 816 may be received by computer system 800 using communications subsystem 810 (e.g., via a wireless or wired signal carrying instructions 816), carried by communication medium 802 to memory device(s) 812, stored within memory device(s) 812, read into main memory 814, and executed by processor(s) 804 to perform one or more steps of the described methods. In another example, instructions 816 may be received by computer system 800 using input device(s) 806 (e.g., via a reader for removable media), carried by communication medium 802 to memory device(s) 812, stored within memory device(s) 812, read into main memory 814, and executed by processor(s) 804 to perform one or more steps of the described methods.

In some embodiments of the present disclosure, instructions 816 are stored on a computer-readable storage medium, or simply computer-readable medium. Such a computer-readable medium may be non-transitory, and may therefore be referred to as a non-transitory computer-readable medium. In some cases, the non-transitory computer-readable medium may be incorporated within computer system 800. For example, the non-transitory computer-readable medium may be one of memory device(s) 812, as shown in FIG. 8 with instructions 816 being stored within memory device(s) 812. In some cases, the non-transitory computer-readable medium may be separate from computer system 800. In one example, the non-transitory computer-readable medium may a removable media provided to input device(s) 806, such as those described in reference to input device(s) 806, as shown in FIG. 8 with instructions 816 being provided to input device(s) 806. In another example, the non-transitory computer-readable medium may a component of a remote electronic device, such as a mobile phone, that may wirelessly transmit a data signal carrying instructions 816 to computer system 800 using communications subsystem 816, as shown in FIG. 8 with instructions 816 being provided to communications subsystem 810.

Instructions 816 may take any suitable form to be read and/or executed by computer system 800. For example, instructions 816 may be source code (written in a human-readable programming language such as Java, C, C++, C #, Python, etc.), object code, assembly language, machine code, microcode, executable code, and/or the like. In one example, instructions 816 are provided to computer system 800 in the form of source code, and a compiler is used to translate instructions 816 from source code to machine code, which may then be read into main memory 814 for execution by processor(s) 804. As another example, instructions 816 are provided to computer system 800 in the form of an executable file with machine code that may immediately be read into main memory 814 for execution by processor(s) 804. In various examples, instructions 816 may be provided to computer system 800 in encrypted or unencrypted form, compressed or uncompressed form, as an installation package or an initialization for a broader software deployment, among other possibilities.

In one aspect of the present disclosure, a system (e.g., computer system 800) is provided to perform methods in accordance with various embodiments of the present disclosure. For example, some embodiments may include a system comprising one or more processors (e.g., processor(s) 804) that are communicatively coupled to a non-transitory computer-readable medium (e.g., memory device(s) 812 or main memory 814). The non-transitory computer-readable medium may have instructions (e.g., instructions 816) stored therein that, when executed by the one or more processors, cause the one or more processors to perform the methods described in the various embodiments.

In another aspect of the present disclosure, a computer-program product that includes instructions (e.g., instructions 816) is provided to perform methods in accordance with various embodiments of the present disclosure. The computer-program product may be tangibly embodied in a non-transitory computer-readable medium (e.g., memory device(s) 812 or main memory 814). The instructions may be configured to cause one or more processors (e.g., processor(s) 804) to perform the methods described in the various embodiments.

In another aspect of the present disclosure, a non-transitory computer-readable medium (e.g., memory device(s) 812 or main memory 814) is provided. The non-transitory computer-readable medium may have instructions (e.g., instructions 816) stored therein that, when executed by one or more processors (e.g., processor(s) 804), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of displaying augmented reality (AR) elements on a display system of a construction machine, the method comprising:
    detecting a position of the construction machine in a world reference frame;
    detecting an orientation of the construction machine;
    detecting a position of an operator of the construction machine in a machine reference frame;
    determining a position of the operator in the world reference frame based on the position of the operator in the machine reference frame, the position of the construction machine in the world reference frame, and the orientation of the construction machine;
    generating the AR elements based on the position of the operator in the world reference frame and a position of the display system in the world reference frame, wherein the AR elements include:
        an implement virtual element corresponding to a position of an implement of the construction machine, the implement virtual element being aligned with a bottom edge of the implement from the operator's perspective;
        a design virtual element corresponding to a design to be carried out by the operator using the construction machine;
        a world virtual element corresponding to a surface of a ground below the position of the implement; and
        a relationship virtual element indicating a direction or a distance between the implement virtual element and either the design virtual element or the world virtual element, wherein the relationship virtual element is positioned between the implement virtual element and either the design virtual element or the world virtual element; and
    displaying the AR elements on the display system.

2. The method of claim 1, wherein the display system includes a projector that projects the AR elements onto a windshield of the construction machine.

3. The method of claim 1, wherein the position of the construction machine in the world reference frame is detected using a machine position sensor that is mounted to the construction machine.

4. The method of claim 3, wherein the machine position sensor is a Global Navigation Satellite System (GNSS) receiver.

5. The method of claim 1, wherein the orientation of the construction machine is detected using a machine orientation sensor that is mounted to the construction machine.

6. The method of claim 1, wherein the position of the operator in the machine reference frame is detected using an operator position sensor that is mounted to the construction machine.

7. The method of claim 6, wherein the operator position sensor is a camera that is configured to capture an image of the operator.

8. A system for displaying augmented reality (AR) elements on a display system of a construction machine, the system comprising:
    one or more processors; and
    a computer-readable medium comprising instructions that, when executed by the one or more processors, cause the one or more processors to perform operations comprising:
        detecting a position of the construction machine in a world reference frame;
        detecting an orientation of the construction machine;
        detecting a position of an operator of the construction machine in a machine reference frame;
        determining a position of the operator in the world reference frame based on the position of the operator in the machine reference frame, the position of the construction machine in the world reference frame, and the orientation of the construction machine;
        generating the AR elements based on the position of the operator in the world reference frame and a position of the display system in the world reference frame, wherein the AR elements include:
            an implement virtual element corresponding to a position of an implement of the construction machine, the implement virtual element being aligned with a bottom edge of the implement from the operator's perspective;
            a design virtual element corresponding to a design to be carried out by the operator using the construction machine;
            a world virtual element corresponding to a surface of a ground below the position of the implement; and
            a relationship virtual element indicating a direction or a distance between the implement virtual element and either the design virtual element or the world virtual element, wherein the relationship virtual element is positioned between the implement virtual element and either the design virtual element or the world virtual element; and
        displaying the AR elements on the display system.

9. The system of claim 8, wherein the display system includes a projector that projects the AR elements onto a windshield of the construction machine.

10. The system of claim 8, wherein the position of the construction machine in the world reference frame is detected using a machine position sensor that is mounted to the construction machine.

11. The system of claim 10, wherein the machine position sensor is a Global Navigation Satellite System (GNSS) receiver.

12. The system of claim 8, wherein the orientation of the construction machine is detected using a machine orientation sensor that is mounted to the construction machine.

13. A non-transitory computer-readable medium comprising instructions that, when executed by one or more processors, cause the one or more processors to perform operations for displaying augmented reality (AR) elements on a display system of a construction machine, the operations comprising:
   detecting a position of the construction machine in a world reference frame;
   detecting an orientation of the construction machine;
   detecting a position of an operator of the construction machine in a machine reference frame;
   determining a position of the operator in the world reference frame based on the position of the operator in the machine reference frame, the position of the construction machine in the world reference frame, and the orientation of the construction machine;
   generating the AR elements based on the position of the operator in the world reference frame and a position of the display system in the world reference frame, wherein the AR elements include:
      an implement virtual element corresponding to a position of an implement of the construction machine, the implement virtual element being aligned with a bottom edge of the implement from the operator's perspective;
      a design virtual element corresponding to a design to be carried out by the operator using the construction machine;
      a world virtual element corresponding to a surface of a ground below the position of the implement; and
      a relationship virtual element indicating a direction or a distance between the implement virtual element and either the design virtual element or the world virtual element, wherein the relationship virtual element is positioned between the implement virtual element and either the design virtual element or the world virtual element; and
   displaying the AR elements on the display system.

14. The non-transitory computer-readable medium of claim 13, wherein the display system includes a projector that projects the AR elements onto a windshield of the construction machine.

15. The non-transitory computer-readable medium of claim 13, wherein the position of the construction machine in the world reference frame is detected using a machine position sensor that is mounted to the construction machine.

16. The non-transitory computer-readable medium of claim 15, wherein the machine position sensor is a Global Navigation Satellite System (GNSS) receiver.

17. The non-transitory computer-readable medium of claim 13, wherein the orientation of the construction machine is detected using a machine orientation sensor that is mounted to the construction machine.

\* \* \* \* \*